US006980595B2

(12) United States Patent
Rose et al.

(10) Patent No.: US 6,980,595 B2
(45) Date of Patent: *Dec. 27, 2005

(54) METHOD AND SYSTEM FOR DISTRIBUTED VIDEO COMPRESSION IN PERSONAL COMPUTER ARCHITECTURE

(75) Inventors: Robert C. Rose, Hudson, MA (US); Matthew J. Adiletta, Worcester, MA (US); Samuel W. Ho, Marlboro, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

This patent is subject to a terminal disclaimer.

(21) Appl. No.: 10/179,659

(22) Filed: Jun. 24, 2002

(65) Prior Publication Data

US 2002/0176502 A1  Nov. 28, 2002

Related U.S. Application Data

(63) Continuation of application No. 09/105,059, filed on Jun. 26, 1998, now Pat. No. 6,411,651.

(51) Int. Cl.[7] .............................. H04N 7/12; H04N 7/15
(52) U.S. Cl. ................................................. 375/240.13
(58) Field of Search ....................... 375/240.02, 240.03, 375/240.04, 240.05, 240.12–240.16, 240.22–240.24; 382/234, 236, 238, 248, 251; H04N 7/12, H04N 7/15

(56) References Cited

U.S. PATENT DOCUMENTS

| | | | |
|---|---|---|---|
| 5,361,105 A | 11/1994 | Iu | |
| 5,438,374 A | 8/1995 | Yan | |
| 5,592,226 A | 1/1997 | Lee et al. | |
| 5,748,913 A | 5/1998 | Shibahara | |
| 5,801,778 A * | 9/1998 | Ju | ................ 375/240.15 |
| 5,801,975 A | 9/1998 | Thayer et al. | |
| 5,926,208 A | 7/1999 | Noonen et al. | |
| 5,995,150 A | 11/1999 | Hsieh et al. | |
| 6,026,217 A | 2/2000 | Adiletta | |
| 6,034,730 A | 3/2000 | Ueda | |
| 6,101,276 A | 8/2000 | Adiletta et al. | |
| 6,163,576 A * | 12/2000 | Lempel | ................ 375/240.24 |
| 6,169,766 B1 * | 1/2001 | Aoki et al. | ............ 375/240.16 |

* cited by examiner

Primary Examiner—Nhon Diep

(57) ABSTRACT

A method and system for compressing video data in a computer has video processing that is distributed between preprocessing hardware in a video capture/controller card and a central processing unit of the computer. Frames of video data are passed to a motion estimation unit of the preprocessing hardware. This unit generates motion information describing inter-frame changes in the video data. Next, motion-compensated temporal filtering is performed on the frames of video data using the motion information. A video frame processing unit of the controller card, used for processing video data to the monitor, is reused for the temporal filtering of the input video data. Finally, the temporally-filtered video data is passed to the central processing unit, which performs inter-frame and/or intra-frame compression with reference to the motion information. In this way, motion-compensated temporal filtering is performed, thus removing the associated noise without adding to the CPU's processing burden, but the costs associated with dedicated compression hardware are avoided by relying on the video capture capabilities in the video controller card.

25 Claims, 5 Drawing Sheets

METHOD AND SYSTEM FOR DISTRIBUTED VIDEO COMPRESSION IN PERSONAL COMPUTER ARCHITECTURE

RELATED APPLICATION

This application is a continuation of U.S. application Ser. No. 09/105,059, filed Jun. 26, 1998. Now U.S. Pat. No. 6,411,651 The entire teachings of the above application are incorporated herein by reference.

BACKGROUND OF THE INVENTION

Computer systems rely on video compression and decompression for video storage/playback and video teleconferencing applications. The objective typically is to reduce the number of transmitted or stored bits needed to represent the original signal while minimizing the loss in resolution when decompressed. By balancing these competing factors, video teleconferencing and other real-time video transfer, for example, can be accomplished within the bandwidth restrictions imposed by local area networks, wide area networks, internetworks, and circuit-switched telephone networks, such as integrated services data network (ISDN) lines or standard telephone lines (POTS).

In order to optimize the bit rate/resolution trade-off, many compression/decompression algorithms are computationally intensive, especially when considering their real-time operation. The three most common compression standards are: MPEG standard developed by the Moving Pictures Experts Group, JPEG standard developed by the Joint Pictures Experts Group, and the H.26x video teleconferencing standard. Each uses a variety of encoding techniques simultaneously on the frames of video data. Specifically, the MPEG and the H.26x standards implement a combination of spatial, temporal, and entropy encoding, while the JPEG standard uses only spatial and entropy encoding.

Generally, there have been three hardware approaches to handling the computational tasks required by video compression/decompression in the context of modern computer, and specifically personal computer/workstation, systems. For example, the central processing unit (CPU) of the computer can perform all of the operations necessary to execute the compression/decompression algorithms. In contrast, at the other end of the spectrum, dedicated compression/decompression hardware can be placed in the computer that is optimized for the task. Finally, a compression co-processor, typically located in a card in the computer system, can be installed, which shares the task of compression/decompression with the central processing unit. One example of hardware designed for the last approach is the DECchip 21230 designed by Digital Equipment Corporation.

There are technical and/or practical problems associated with each of the typical approaches. The CPU is generally not well optimized for handling pixel-granularity video data. Many times the data units are eight bits or less, whereas the CPU is generally designed for 32 or 64 bit wide data paths. Single instruction multiple data architectures (SIMD) are typically better adapted to handle these kinds of operations where a common series of operations are performed on many pixels of data. Dedicated compression hardware utilizes these SIMD architectures and consequently works well, but is typically too expensive for the consumer/small business environments. Many times the compression hardware alone will exceed the cost of the average desktop machine. Finally, the compression co-processor approach provides a better price/performance trade-off but is still an expensive hardware upgrade in an increasingly commoditized computer market.

A parallel trend in the computer industry is the combination of video capture and video control capabilities on a single card. As a result, these cards typically have a video output port to control the monitor and video-inputs for receiving RGB, NTSC, and/or PAL encoded video signals.

SUMMARY OF THE INVENTION

The present invention is directed to a video compression system for a computer that distributes processing responsibility between the computer's central processing unit and co-processing resources. In this way, it avoids the costs associated with dedicated compression hardware while still allowing compression/decompression to occur in, or near, real-time. It capitalizes, however, on the trend toward integrating video capture capabilities into the video controller cards, in the preferred embodiment. Specifically, the video card is modified to include a motion estimation unit, which generates motion information describing inter-frame changes in the video data. The card then uses this motion information to perform motion-compensated temporal filtering on the video data before it is passed to the CPU, which performs the inter-frame and/or intra-frame compression. In a preferred embodiment, the temporal filtering reuses the video controller's data path and frame buffer, both of which are also used to perform frame processing for the video display.

In general, according to one aspect, the invention features a method for compressing video data. The method comprises passing frames of video data to a motion estimation unit of the preprocessing hardware. This unit generates motion information describing inter-frame changes in the video data. Next, motion-compensated temporal filtering is performed on the frames of video data using the motion information in a video frame processing unit of the preprocessing hardware. Finally, the temporally filtered video data is passed to the central processing unit, which performs inter-frame and/or intra-frame compression with reference to the motion information. In this way, motion-compensated temporal filtering is performed, thus removing the associated noise without adding to the CPU's processing burden.

In specific embodiments, the preprocessing hardware is located on a video capture card of the computer that also functions as a video controller, reusing the video frame processing unit and frame buffer. Further, pixel decimation can be additionally utilized.

The motion-compensated temporal filtering preferably comprises averaging values of pixels in a current frame with matching pixel values of a previous frame. Matching pixels are located by reference to motion vectors developed during the motion estimation. Since the filtering is motion compensated, heavier filtering algorithms can be utilized without degrading images within the frames such as by the generation of ghost trails around moving images.

In general, according to another aspect, the invention also features a video preprocessing and compression system for a computer. The system comprises a motion estimation unit that generates motion information describing inter-frame changes in video data. A video frame processing unit performs motion-compensated temporal filtering on frames of the video data using the motion information. The processed data is then passed to the central processing unit, which performs inter-frame and/or intra-frame compression with reference to the motion information. As a result of this division of processing, resources on a video capture card may be utilized to reduce the CPU's processing burden and video controller resources reused for compression.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, like reference characters refer to the same parts throughout the different views. The drawings are not necessarily to scale, emphasis instead being placed upon illustrating the principles of the invention. Of the drawings.

Figure 1:
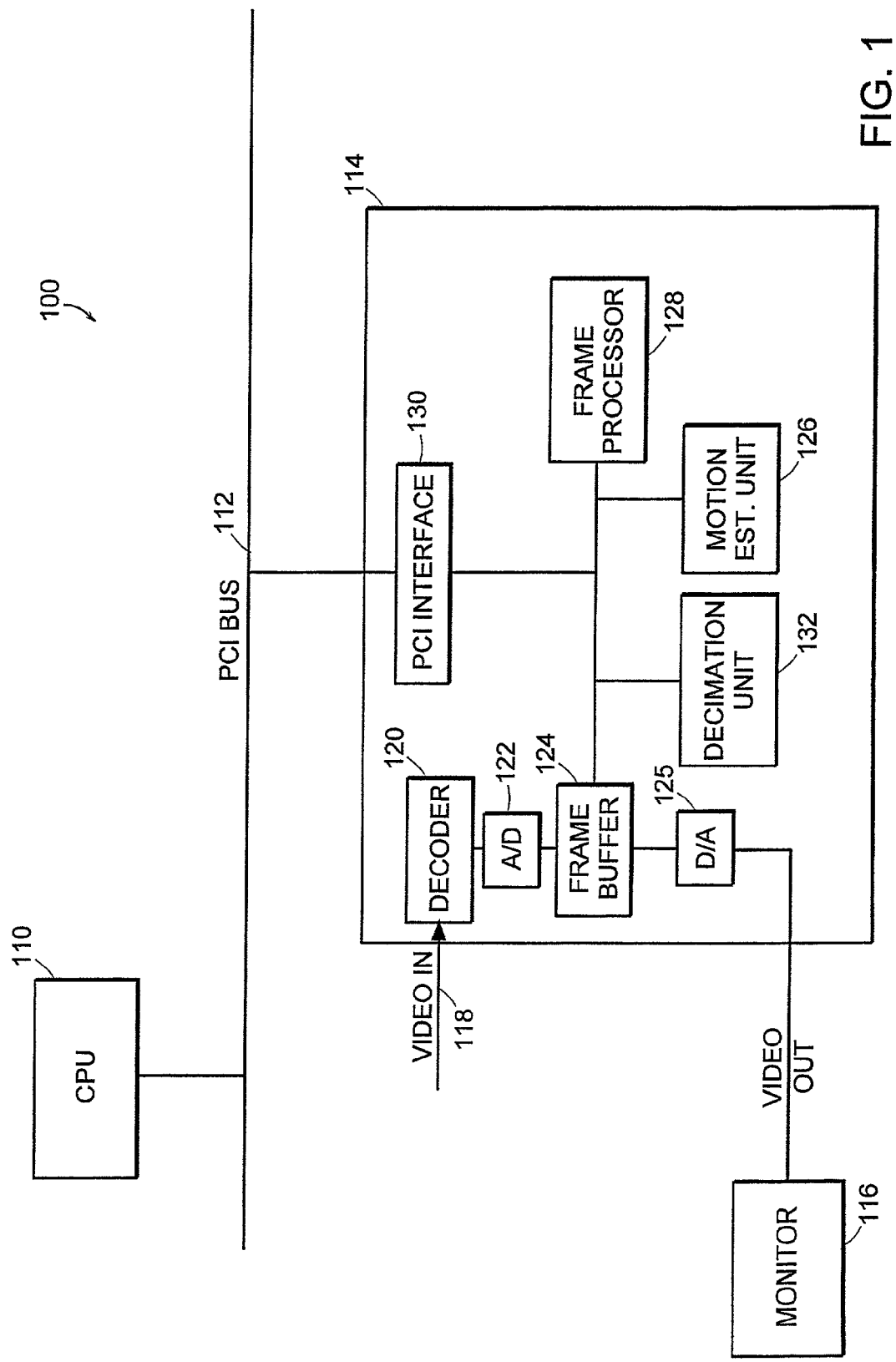
FIG. 1 is a block diagram showing CPU, video capture/controller card and the connecting bus in accordance with the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 illustrates a computer system 100 that performs video preprocessing and compression in accordance with the principles of the present invention. Generally, as is common in many personal computer systems, a central processing unit (CPU) 110 represents the computation core of the computer. It connects to peripheral devices via a bus 112, which in the preferred embodiment is a peripheral component interconnect (PCI) protocol bus.

A video capture/controller card 114 communicates with and is controlled by the CPU 100 via the PCI bus 112, principally to convert video data into the format needed to drive the monitor 116. Specifically, data and instructions are received from the CPU 100 through PCI interface 130, and the data is stored in the frame buffer 124. Frame processor 128 operates on this data to generate pixel frame data appropriate for display on the monitor 116 after digital-to-analog conversion in D/A unit 125.

The controller card 114 has additional video capture capabilities. Specifically, NTSC or PAL-formatted analog video signals are received via a video input port 118 to a video decoder 120. The decoder 120 converts the signals into luminance and chrominance signal format typically found in computers. The signals are then digitized in an analog-to-digital converter 122. In one typical implementation, the analog video signal is generated by the computer system's video camera, providing desktop video teleconferencing features.

In order to compress the high bit rate video signal from the camera, the computer system 100 implements video compression. According to the invention, the video capture/controller card 114 functions as a compression pre-processor for the CPU 110 executing the main portions compression algorithm.

The digitized input video signal is buffered in the frame buffer 124, with the display data where it is accessed by a motion estimation unit 126, which performs the first step in the compression preprocessing. This unit analyzes successive frames of the video data to generate motion information for the frames that is descriptive of how the video images within the frames change from frame-to-frame.

The video frame data are also accessed by decimation unit 132 in one implementation. This results in a gross decrease in the number of pixels per frame, typically both horizontally and vertically.

Once the motion information is computed for a frame, the frame processing unit 128 low-pass filters the video data for the frame. This processing unit is the same as that used to operate on video data to be displayed on the monitor 116, thus reusing existing resources. The video frame processing unit 128 utilizes the motion information generated by the motion estimation unit 126 to perform motion-compensated temporal filtering. Once finished, the now-temporally filtered frame of video data in the frame buffer 124 is sent to the CPU 110 via the PCI bus interface 130 and bus 112 as a DMA packet. The video compression is completed in the CPU.

Figure 2:
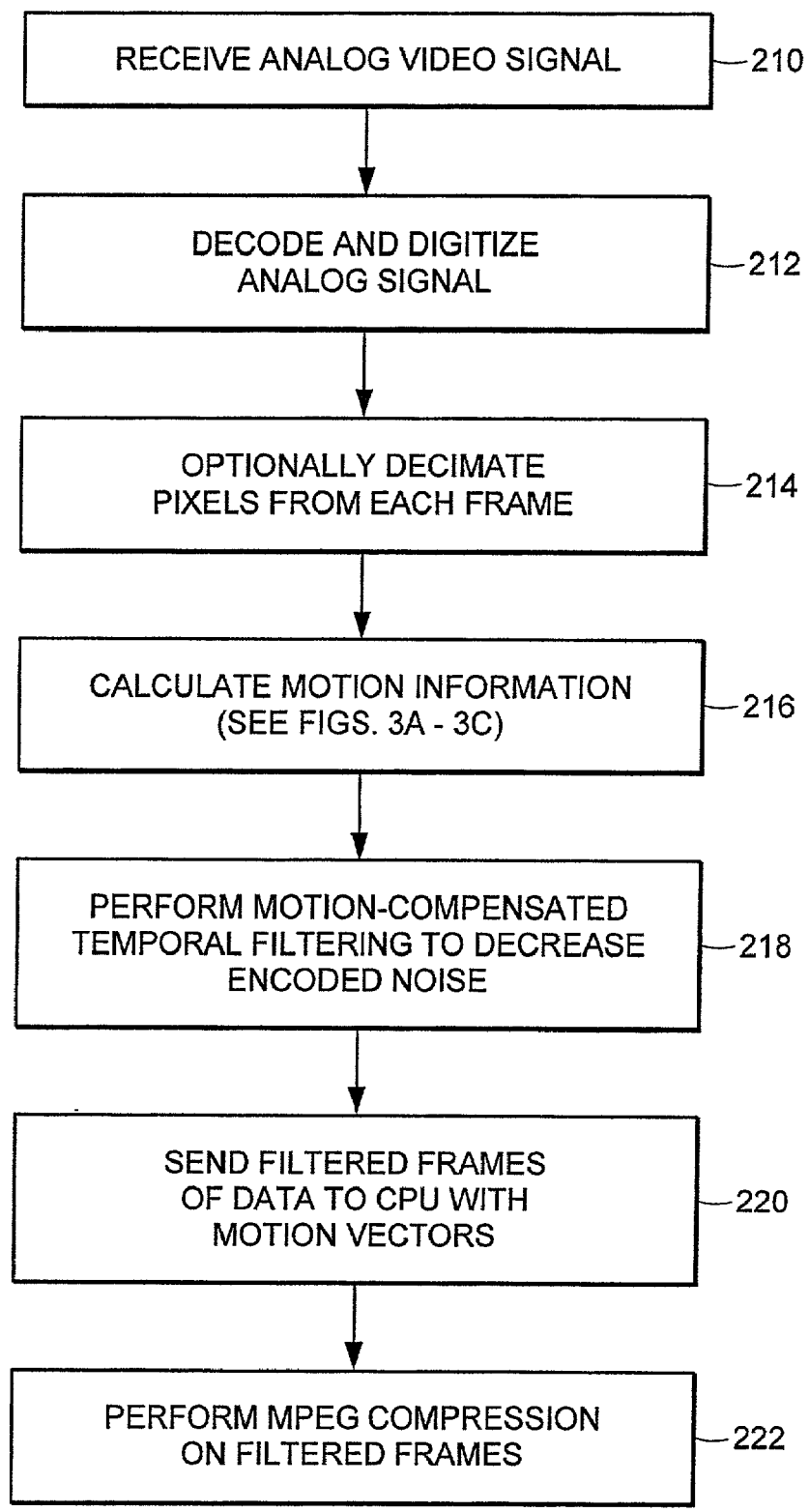
FIG. 2 is a process diagram illustrating the preprocessing and video compression in accordance with the invention.

FIG. 2 is a process diagram illustrating in more detail the video compression performed by the present invention. In step 210, the raw, analog video is input into the video port 118 of the video capture/controller card 114. The video decoder 120 translates the video signal to the digital YUV format according to the CCIR601 standard at either an NTSC format of 720 pixels by 480 scan lines at 29.97 frames/second or the PAL format of 720 pixels by 576 lines at 25 frames/second. The converted signal is digitized in step 212, and the resulting frame data stored in frame buffer 124.

As a first step in the compression process, the decimation unit 132 is used to decrease the number of scan lines and the number of pixels in each scan line in step 214. Number of lines and pixels in each line is reduced by one half in one embodiment. Decimation is not critical, however, being a somewhat destructive technique for reducing data per frame.

In next step 216, motion estimation is performed by the motion estimation unit 126 by comparing the video data of successive frames. The present invention preferably performs macroblock-based motion estimation by comparing particular macro-blocks in a current frame with similarly-sized macro-blocks in a reference frame, preferably an earlier frame.

Motion estimation covers a set of techniques used to extract the motion information from a sequence of video frames. The MPEG standard represents motion information by providing one or two motion vectors per macro-block, depending upon the type of motion compensation: forward-predicted, backward-predicted, or average.

In the preferred embodiment, each pixel in a particular frame is modeled as a moving object in three dimensional space: horizontal, vertical, and time. A correlation procedure is performed on successive frames to provide information about the flow of pixels between successive frames.

Figure 3B:
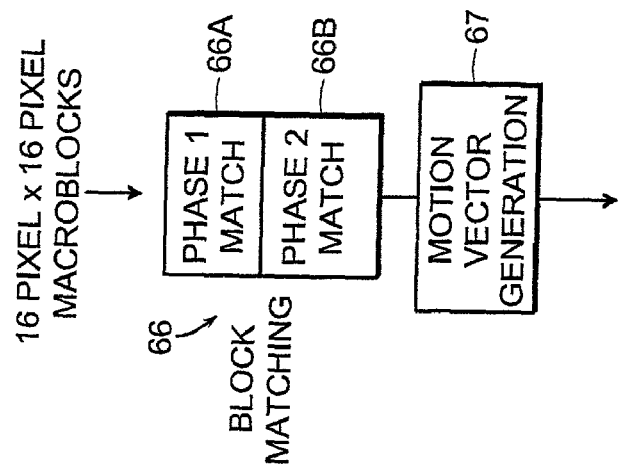
FIGS. 3A, 3B, and 3C are schematic drawings and a process diagram illustrating the motion estimation performed by the present invention.
Figure 3A:
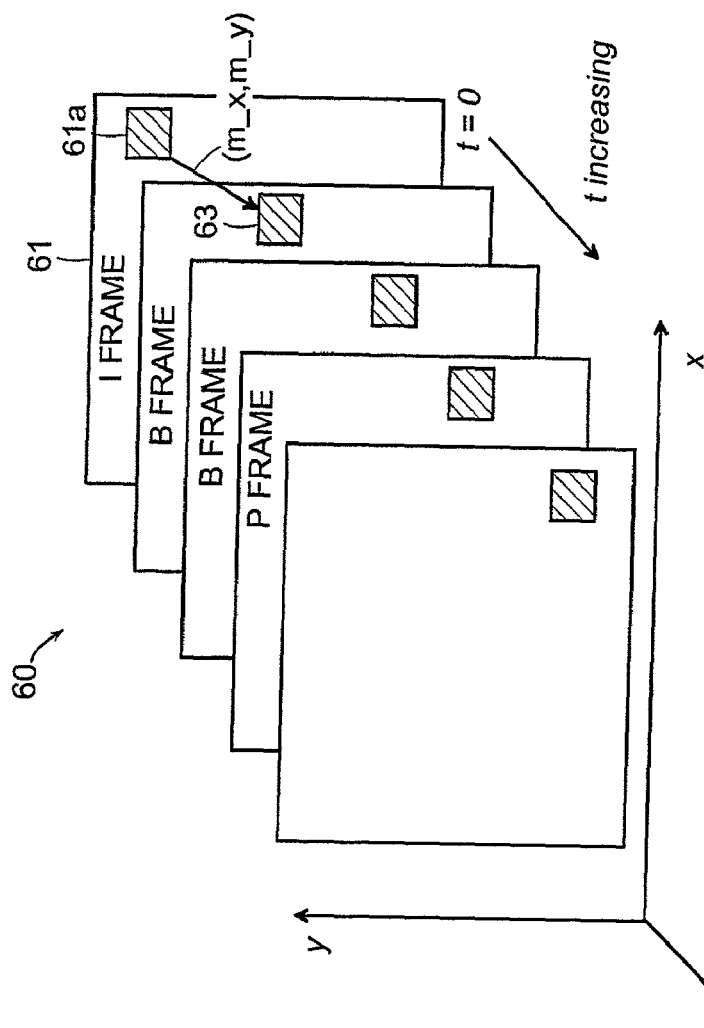
Figure 3C:
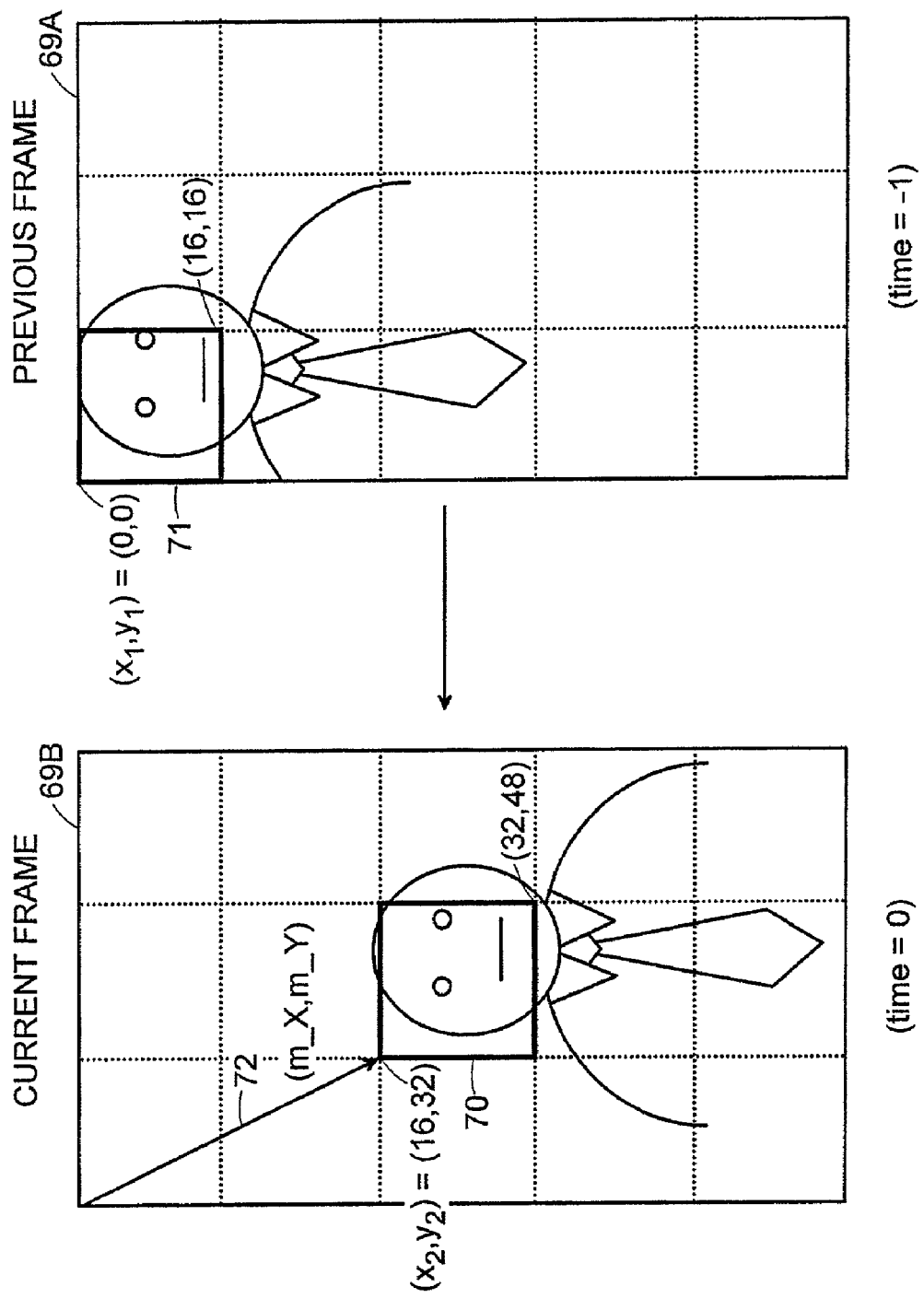

The motion estimation process is described relative to FIGS. 3A, 3B, and 3C. Each frame of a series of frames 60 includes pixels designated via a Cartesian (X,Y) coordinate system. The series of frames is provided in increasing temporal order, with frame 61 being the frame input at time zero. Each frame is apportioned into 16 pixel by 16 pixel macro-blocks. Each pixel comprises 8 bits of luminance data, and 8 bits of $C_b$ and $C_r$ data. An exemplary macro-block on which motion estimation is to be performed is shown shaded as macro-block 63.

The first step is block matching. The premise is to find the block position within a larger region of the frames that minimizes error in luminance data from the reference frame. The size of the "outer" square block in which the search is conducted is programmable. The size of the "inner" block to be matched is varied based upon the mode that is selected. Various modes include a sub-sample search that uses a sub-sample luminance data to perform block matching, a full search that uses full resolution luminance data, and half-pixel search that uses full resolution luminance data and matches the half pixel boundaries by interpreting luminance values into the half pixel positions. For example, the block matching algorithm for the full search finds the value of i,j that produces the minimum error. The error is defined as:

$$E_{ij} = \sum_{x=0}^{pixels-1} \sum_{y=0}^{pixels-1} (|P_{x,y} - R_{x+i,y+j}|) \qquad \text{Equation I}$$

In Equation I, the constant "pixels" refers to the number of pixels comprising the group of pixels used in a particular search method. For example, when using the full search method, the constant Pixels has a value of 256 and when using a sub-sampled method it has a value of 64. Variables P and R refer to the luminance values of pixels at position (x,y) in a current frame and position (x+i, y+j) in a reference frame respectively. When the best matching macro-block is identified, its location is treated as the prior location of the current macro-block for the purposes of motion compensation and for applying a filter on the video data.

After a matching macro-block is found, the motion estimation procedure continues to calculate the coordinates of a motion vector which, when added to the coordinates of any pixel in the matching reference macro-block, will generate the coordinates of a corresponding pixel in the current macro-block. Because the motion estimation procedure is performed on a macro-block basis, all calculations that would otherwise be performed on a pixel-by-pixel basis are preformed on a macro-block basis. For example, every pixel comprising a macro-block will be presumed to have moved in the same direction and by the same amount. Therefore this method represents a coarse approximation that is much faster and requires less computation power than the pixel-wise calculation of optical flow or motion estimation.

It should be noted that the present invention should not be limited to the above searching techniques, as other searching techniques known to those of skill in the art, such as telescopic searching or hierarchal full searching would prove equally effective.

The motion estimation procedure of the preferred embodiment uses a hierarchical search technique including a phase I coarse search followed by finer grained searches. During phase I (66*a*), the first pass motion match is performed in sub-sampled space, using 8×8 pixel compares. Upon completion, the motion estimation process has a clue as to the general area to determine the best match.

During phase II of the motion estimation process, the entire raw frame data is compared against the reconstructed reference frame to find the best match, using 16×16 pixel compares. The macro-block in the earlier frame which is the best match to the macro-block in the current frame is the one which has the lowest value using the above-mentioned technique.

At step 67 a motion vector is calculated that identifies the relationship between the present macro-block and the previous, matched, macro-block. For example, motion vector (m_x, m_y) will identify the change in position of the pixels between macro-block 60*a* and macro-block 63.

FIG. 3C illustrates the process of generating motion vectors. Two temporally consecutive video frames, 69*a* and 69*b*, are shown for illustration purposes. Also shown is a macro-block 71, the pixels of which have moved from a first position at time −1, to a second position at time 0. Thereafter, these pixels comprise macro-block 70. If the motion of the macro-block 71 from the first to the second position is represented by a vector (m_x, m_y) 72, specifying the shift in the x and y directions, the reference macro-block 64 can be motion compensated simply by adding vector 72 to it. Therefore, corresponding pixels from each macro-block are constructively aligned.

For example, in this illustration the motion compensation vector 72 is calculated by subtracting the coordinates of one of the pixels comprising macroblock 71 from a corresponding pixel comprising macroblock 70:

$$(m\_x, m\_y) = (x_2 - x_1, y_2 - y_1)$$
$$= (16 - 0, 32 - 0)$$
$$= (16, 32)$$

Thereafter, adding motion compensation vector 72 to any pixel coordinates in macroblock 71 yields the coordinates for the motion compensated pixel, i.e., the corresponding pixel in the macroblock of interest 70. The motion compensation method is performed as follows:

determine location of pixel in macroblock 64=(16,16)

calculate location of motion compensated pixel=
(x+m_x,y+m_y)=(16+16,16+32)=(32,48)

It should be reenforced that it is necessary to calculate motion estimation only once for each macroblock, as opposed to once for each pixel as required by the prior art.

Returning to FIG. 2, the motion information, i.e., the calculated motion vectors for each macro-block, is used to perform motion-compensated temporal filtering in step 218. There is always a certain level of noise that is added that results in degradation of the video data. Sources of noise typically include camera optics, inadequate lighting conditions, and sampling errors during the transformation of signals from analog to the digital domain. When noise is present, the compression methods invariably will encode it as if it were part of the original video signal. Because noise elements are completely random and contain high frequencies, they require a significant computation time and memory to compress. Further noise elements contribute to lower frame rates because of the increased number of bits needed to encode it. Temporal filtering is a process that removes this parasitic noise by averaging each frame with reference to previous and/or subsequent frame or frames.

In the preferred embodiment, each macro-block in the current frame is averaged with respect to the matching macro-block in the previous frame. The matching macro-block is found by reference to the motion vectors developed during the motion estimation step. In one implementation, a weighted average is performed in which pixels the current filtered frame are set to equal 0.75(current frame pixel value)+0.25(matching pixel value in the previous frame).

The fact that the temporal filtering is motion compensated allows heavier filtering to be performed. This decreases the noise in the filtered frame while avoiding ghost trails on moving images, which can occur without motion estimation.

As each successive frame is temporally filtered, it is sent with its motion information to the CPU in step 220. The CPU 110 functions as the compression engine implementing the MPEG standard compression in step 222.

According to the MPEG standard, each video input frame is compressed into one of three types of frames either: an intra-coded frame (I), a predicted frame (P), or a bi-directional frame (B). Intra-coded frames provide access points for random access with moderate, spatial compression of the image. Predicted frames are coded with reference to past intra-coded or predicted frames, and are in general used as a reference for future predicted frames. Bi-directional frames provide the highest amount of compression, but require both a past and a future reference for prediction.

A typical MPEG compression sequence of raw frame data into the three frames types is shown below, where the letters I, P and B are used to designate the type of MPEG frame, and the reference designators are used to indicate the order of receipt of the frames:

I1 B2 B3 P4 B5 B6 P7 B8 B9 P10 B11 B12 I13

In the above sequence, it can be seen that every third input frame is a compressed as a reference frame. This frame sequence is described as having a m=3 reference distance.

Figure 4:
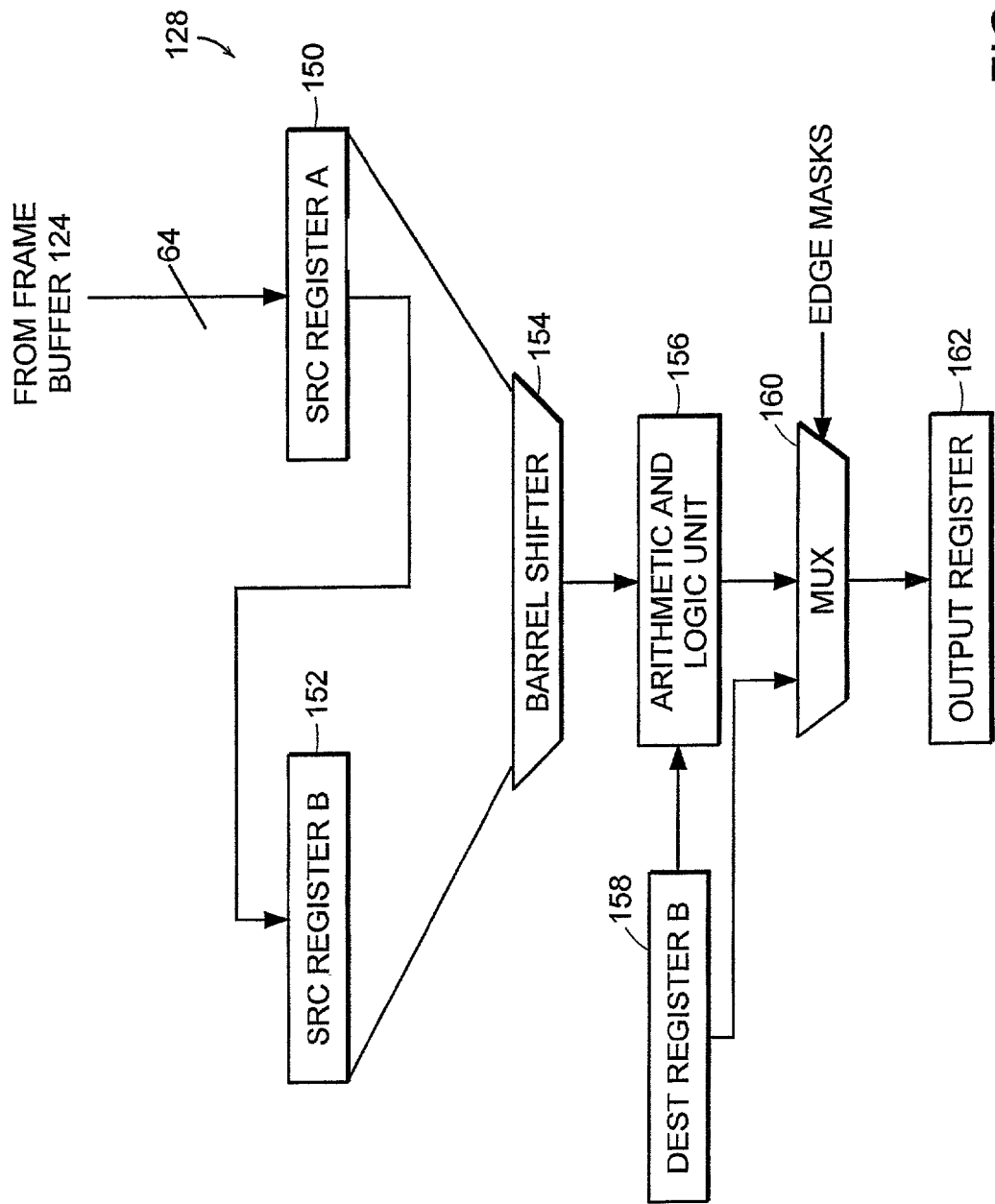
FIG. 4 is a block diagram illustrating frame processing unit in the video controller/capture card in accordance with the invention.

FIG. 4 shows the frame processing data path 128 of the video capture/controller card 114 that enables temporal filtering according to the invention.

As is common in most conventional video cards, two 64-bit wide source (SRC) registers 150, 152 are placed to serially receive successive 64 bit words of data from a 64 bit wide data path to the frame buffer 124. This system of cascaded eight byte registers is useful since many systems operate with 8-bit pixels that are addressed in 8 byte-wide words in the frame buffer 124. In combination with the barrel shifter 154, any contiguous 64 bits of pixel data from the previous frame of data can be selected for operation. This gives the capability to align pixel data from a previous frame with matching pixel data of the current frame using the motion vectors.

The barrel shifter 154 feeds the selected eight bytes of data into a logic unit 156 that performs both arithmetic and/or logic operations. Specifically, through a combination of binary shifts and adds, 0.25 of the previous frame pixel values in the eight bytes from the shifter is added to 0.75 the pixel values in destination register 158, which hold data for the present frame.

In the typical video controller data path, the arithmetic functions are not strictly required. Capability only for XOR, OR, AND, and similar functions are provided. In the present invention, however, the data path 128 is modified to enable the temporal filtering for encoding the input data signal. As a result, the arithmetic logic unit additionally provides weighting (pixel-wise shifting) and adding functions needed for temporal filtering.

The output of the arithmetic logic unit feeds into a multiplexer 160 that is used to control edge masking by selecting between the output from the ALU 156 and the destination register 162. The edge-masked result is held in output register prior to being stored back to the frame buffer 124.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A video preprocessing and compression system for a computer, the system comprising:
   pre-processing hardware including:
      a frame buffer for storing multiple frames of video data; and
      a motion estimation unit that generates motion information describing inter-frame changes in the video data; and
      a central processing unit that performs inter-frame and/or intra-frame compression on the video data with reference to the motion information such that the preprocessing hardware reduces central processing unit processing burden and resources of the preprocessing hardware are reused for compression purposes.

2. The system as described in claim 1, wherein the pre-processing hardware is located on a video capture card of the computer.

3. The system as described in claim 2, wherein the video capture card further controls a monitor of the computer.

4. The system as described in claim 1, wherein the pre-processing hardware further comprises a video frame processing unit for processing video data for display on a monitor of the computer.

5. The system as described in claim 4, wherein the motion estimation unit and the video frame processing unit are located on a video controller card of the computer.

6. The system as described in claim 1, wherein the motion information comprises motion vectors.

7. A method for compressing video data in a computer that distributes video processing between pre-processing hardware and a central processing unit of the computer, the method comprising:
   passing frames of video data to a motion estimation unit of the pre-processing hardware to generate motion information describing inter-frame changes in the video data; and
   passing the video data to the central processing unit for performing inter-frame and/or intra-frame compression of the video data with reference to the motion estimation, such that the step of passing frames to the motion estimation unit reduces central processing unit processing burden and refuses resources of the preprocessing hardware for compression process.

8. The method as described in claim 7, further comprising locating the pre-processing hardware on a video capture card of the computer.

9. The method as described in claim 8, further comprising controlling a monitor of the computer with the pre-processing hardware.

10. The method as described in claim 7, further comprising processing video data for display on a monitor of the computer using the pre-processing hardware.

11. The method as described in claim 7, wherein the motion estimation comprises motion vectors.

12. The method as described in claim 7, further comprising performing temporal filtering on the video data prior to performing inter-frame and/or intra-frame compression.

13. A video preprocessing and compression system for a computer, the system comprising:
pre-processing hardware including:
a frame buffer for storing multiple frames of video data; and
a video frame processing unit that performs temporal filtering on frames of the video data; and
a central processing unit that performs inter-frame and/or intra-frame compression on the temporally-filtered video data such that the preprocessing hardware reduces central processing unit processing burden and resources of the preprocessing hardware are reused for compression purposes.

14. The system as described in claim 13, wherein the pre-processing hardware is located on a video capture card of the computer.

15. The system as described in claim 14, wherein the video capture card further controls a monitor of the computer.

16. The system as described in claim 13, wherein the video frame processing unit further processes video data for display on a monitor of the computer.

17. The system as described in claim 13, wherein the video frame processing unit is located on a video controller card of the computer.

18. The system as described in claim 13, wherein the frame buffer stores a current frame of video data and a previous frame of video data, the video frame processing unit receiving matching pixels in the current frame and the previous frame and averaging the corresponding pixel values to generate a pixel value for a pixel of the current frame.

19. The system as described in claim 13, further comprising a motion estimation unit generating motion information describing inter-frame changes in the video data, the video frame processing unit performing motion-compensated temporal filtering on frames of the video data with reference to the motion information.

20. A method for compressing video data in a computer that distributes video processing between pre-processing hardware and a central processing unit of the computer, the method comprising:
in the preprocessing hardware, performing temporal filtering of frames of video data; and
passing the temporally-filtered video data to the central processing unit for performing inter-frame and/or intra-frame compression of the video data such that the preprocessing hardware reduces central processing unit processing burden and resources of the preprocessing hardware are reused for compression purposes.

21. The method as described in claim 20, further comprising locating the pre-processing hardware on a video capture card of the computer.

22. The method as described in claim 21, further comprising controlling a monitor of the computer with the pre-processing hardware.

23. The method as described in claim 20, further comprising processing video data for display on a monitor of the computer using the pre-processing hardware.

24. The method as described in claim 20, wherein the step of performing temporal filtering comprises averaging the values of pixels in a current frame with matching pixel values of a previous frame.

25. The method as described in claim 20, further comprising generating motion information describing inter-frame changes in the video data, and performing motion-compensated temporal filtering on frames of the video data with reference to the motion information.

* * * * *

UNITED STATES PATENT AND TRADEMARK OFFICE
CERTIFICATE OF CORRECTION

PATENT NO. : 6,980,595 B2  
APPLICATION NO. : 10/179659  
DATED : December 27, 2005  
INVENTOR(S) : Robert C. Rose et al.

Page 1 of 1

It is certified that error appears in the above-identified patent and that said Letters Patent is hereby corrected as shown below:

In column 8, line 60, in Claim 7, delete "refuses" and insert -- reuses --, therefor.

In column 8, line 61, in Claim 7, delete "process." and insert -- purposes. --, therefor.

Signed and Sealed this

First Day of September, 2009

David J. Kappos  
*Director of the United States Patent and Trademark Office*